Aug. 5, 1952　　　G. H. KRESS ET AL　　　2,605,871
FASTENING DEVICE
Filed March 3, 1949
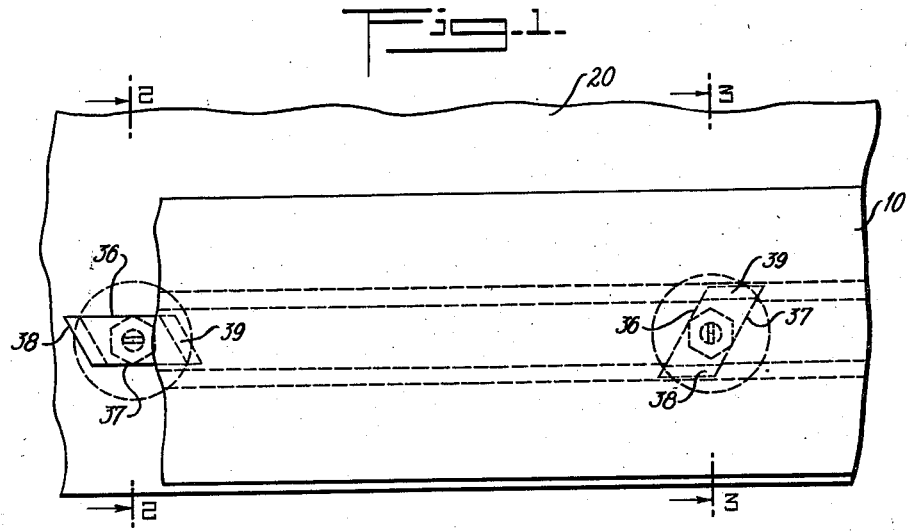
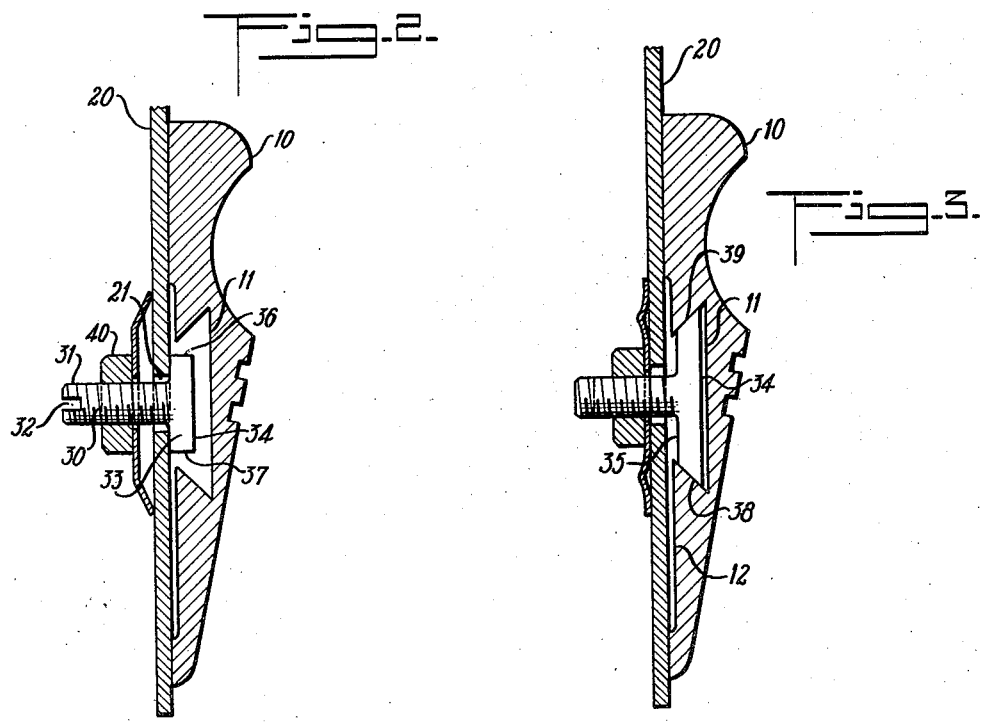
INVENTORS
George H. Kress.
Albert W. Kapfer
BY William Lang
ATTORNEY Patented Aug. 5, 1952

2,605,871

UNITED STATES PATENT OFFICE 2,605,871

FASTENING DEVICE

George H. Kress, Vestal, and Albert W. Kapfer, Endicott, N. Y., assignors to International Business Machines Corporation, New York, N. Y., a corporation of New York Application March 3, 1949, Serial No. 79,324

1 Claim. (Cl. 189—88)

This invention relates to fastening devices and latches. More specifically, it relates to a fastening device for securing a decorative molding or beading to a panel forming a portion of a cover for a machine.

It is an object of this invention to provide a fastening device for a molding or the like, which fastening device is hidden from view by the molding.

It is a further object of the invention to provide a fastening device which facilitates rapid installation and removal of the molding.

A still further object is to provide a fastening device which will permit the molding to be attached or removed without sliding, so that panels bounded by re-entrant angles may receive a molding.

A final specific object of this invention is to provide a fastening device that is easily and economically manufactured by mass production methods.

Other objects of the invention will be pointed out in the following description and claim and illustrated in the accompanying drawing, which discloses, by way of illustration, the principle of the invention and the best mode, which has been contemplated, of applying that principle.

In the drawing:

Fig. 1 is a plan view of the molding installed on the panel.

Fig. 2 is a section taken along the line 2—2 showing the fastening device in the unlatched position.

Fig. 3 is a section taken along the line 3—3 showing the fastening device in the latched position.

In Figs. 1, 2 and 3 a representative length of a molding 10 is shown affixed to a panel 20 which in the present embodiment forms a portion of a cover for a business machine. The fastening means 30, two of which are shown, are spaced at intervals beneath the molding in order to secure it to the panel.

The molding 10 in the present embodiment serves a purely decorative function and as such has an external configuration in harmony with the design of the cover of the machine. As can be seen in the drawing, the molding is provided with the longitudinally disposed dovetailed groove 11 opening into the face 13, which face abuts the panel 20. A further groove 12 is provided so as to reduce the contact area between the molding and the panel in order to lessen the effect of surface irregularities in the panel upon the tightness of fit between the molding and the panel. The resulting cross section of the molding lends itself to manufacture by extrusion methods.

The fastening means 30 consists of the threaded shank 31 having the transverse slot 32 and the hexahedral head 33. This head is bounded by plane surfaces 34, 35, 36, 37, 38 and 39 having the geometric shapes and interrelationships hereinafter to be defined.

The surfaces 34 and 35 are rhomboids parallel to one another and normal to the axis of stud 31 at the intersections of the diagonals of the rhomboids. The lesser diagonals of these rhomboidal surfaces, and consequently of all intermediate rhomboidal sections, are slightly greater than the perpendicular distances between the lesser sides of the rhomboids, these perpendiculars lying within the boundaries of the rhomboids. The surfaces 36 and 37 are trapezoids parallel to one another and perpendicular to the surfaces 34 and 35. The final two surfaces 38 and 39 are also rhomboids, the planes of which intersect the planes of the surfaces 34 and 35 with substantially the same angles of obliquity as those subtended by the sides and the bottom of the groove 11 in molding 10.

The fastening means 30 pass through holes 21 in panel 20 and are fastened by means of nuts 40 and spring washers 41. These remain assembled on the panel.

In installing the molding upon the panel the latch members are first aligned with the longer sides of the hexahedral heads 33 parallel to the groove 11 as shown at 2—2 in Fig. 1 and also in Fig. 2. The molding 10 is then held abutting the panel 20 with the groove 11 enclosing the heads of the fastening devices. The latch members are then rotated by means of a screwdriver in slot 32 so that they occupy the position shown at 3—3 of Fig. 1 and also in Fig. 3, thus securing the molding. At this time the fastening devices may be locked by lightening the nuts 40.

The latching action of the members 30 in securing the molding may not be readily apparent from the foregoing discussion. Therefore, the coaction of the surfaces of the latch head 33 and the surfaces of the groove 11 will now be discussed. It will be noted that latch head 33 in the unlatched position, as shown in Fig. 2, abuts the panel 20, and that in the latched position (Fig. 3) the head 33 is held away from the panel by groove 11. During the rotation of the latch head 33 from its unlatched to its latched position, the oblique surfaces 38 and 39 engage the complementary surfaces of the groove 11 to cam the head into the groove. Since the lesser diagonal of the head is slightly greater than the perpendicular distance between the oblique sides, the head 33 is cammed into the groove as the head is rotated until the diagonal is perpendicular to the groove. Further rotation of the head positions the perpendicular of the head across the groove, which perpendicular being smaller than the diagonal allows the head to move away from the bottom of the groove under the action of the spring washer 41. Thus, the head 33 is resiliently latched in a neutral position by the diagonals of the head and may be locked by tightening the nut 40.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is:

The combination of a member detachably affixed to a panel with a face thereof abutting the panel, said member having a dovetailed groove open to said face; and a latch in cooperative engagement with the oblique surfaces of a portion of said groove, said latch comprising a threaded stud and a hexahedral head bounded by two parallel rhomboidal surfaces perpendicular to the axis of the stud, the lesser diagonals of the rhomboids being slightly greater than the perpendicular distances between the lesser sides thereof, by two trapezoidal surfaces perpendicular to and intersecting the rhomboidal surfaces at the greater sides of the rhomboids, and by two surfaces oblique to the rhomboidal surfaces, the angles of obliquity of which are substantially equal to those of said dovetailed groove; whereby when the latch is rotated so as to align the longer sides of the rhomboids with the dovetailed groove of said member the member may be removed from abutting the panel.

GEORGE H. KRESS.
ALBERT W. KAPFER.

REFERENCES CITED

The following references are of record in the file of this patent:

UNITED STATES PATENTS

| Number | Name | Date |
|---|---|---|
| 1,308,276 | Connell | July 1, 1919 |
| 2,278,627 | Wernig | Apr. 7, 1942 |
| 2,328,977 | Hasenburger et al. | Sept. 7, 1943 |